(12) United States Patent
Sudak

(10) Patent No.: US 8,412,263 B2
(45) Date of Patent: *Apr. 2, 2013

(54) COEXISTENCE INTERFACE FOR MULTIPLE RADIO MODULES USING A REDUCED NUMBER OF CONNECTIONS

(75) Inventor: Eran Sudak, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 650 days.

This patent is subject to a terminal disclaimer.

(21) Appl. No.: 12/533,088

(22) Filed: Jul. 31, 2009

(65) Prior Publication Data

US 2010/0142500 A1 Jun. 10, 2010

Related U.S. Application Data

(63) Continuation-in-part of application No. 12/327,838, filed on Dec. 4, 2008, now Pat. No. 8,095,176.

(51) Int. Cl.
*H04M 1/00* (2006.01)
*H04B 7/00* (2006.01)

(52) U.S. Cl. ................ 455/552.1; 455/553.1; 455/41.2; 370/338; 370/348

(58) Field of Classification Search ............... 455/552.1, 455/553.1, 132, 103, 227–229; 370/338, 370/342, 344, 348
See application file for complete search history.

(56) References Cited

U.S. PATENT DOCUMENTS

| | | | |
|---|---|---|---|
| 8,094,631 B2 * | 1/2012 | Banerjea et al. | 370/338 |
| 8,095,176 B2 * | 1/2012 | Sudak | 455/552.1 |
| 2007/0232358 A1 * | 10/2007 | Sherman | 455/560 |
| 2007/0275746 A1 * | 11/2007 | Bitran | 455/509 |
| 2008/0051085 A1 * | 2/2008 | Ganton | 455/435.2 |
| 2008/0205365 A1 * | 8/2008 | Russell et al. | 370/341 |
| 2008/0233875 A1 | 9/2008 | Desai et al. | |
| 2008/0247445 A1 * | 10/2008 | Guo et al. | 375/220 |
| 2009/0003307 A1 * | 1/2009 | Yang et al. | 370/350 |
| 2009/0081962 A1 * | 3/2009 | Sohrabi | 455/79 |
| 2009/0103474 A1 * | 4/2009 | Lu et al. | 370/328 |
| 2009/0213804 A1 * | 8/2009 | Yoon et al. | 370/329 |
| 2010/0226348 A1 * | 9/2010 | Thoukydides | 370/338 |
| 2010/0322287 A1 * | 12/2010 | Truong et al. | 375/133 |

FOREIGN PATENT DOCUMENTS

| | | |
|---|---|---|
| EP | 1944914 A2 | 7/2008 |
| GB | 2412817 A | 10/2005 |
| WO | 2007/132316 A2 | 11/2007 |
| WO | 2007/132316 A3 | 4/2008 |
| WO | 2011/014360 A2 | 2/2011 |

(Continued)

OTHER PUBLICATIONS

Bluetooth Special Interest Group, Telephony Working Group "Bluetooth/WiMAX Coexistence—Solution and Recommendations", May 12, 2008, pp. 1-74.

(Continued)

*Primary Examiner* — Duc M Nguyen
(74) *Attorney, Agent, or Firm* — Cool Patent, P.C.; Kenneth J. Cool; Joseph P. Curtin

(57) ABSTRACT

Briefly, in accordance with one or more embodiments, a first radio is operated in a first coexistence mode between the first radio and a second radio. The first radio monitors a first signal received from a third radio to determine if the third radio is active. In the event the third radio is active, the first radio switches to a second coexistence mode between the first radio and the third radio, and the first radio then operates in the second coexistence mode.

15 Claims, 6 Drawing Sheets

FOREIGN PATENT DOCUMENTS

WO 2011/014360 A3 4/2011

OTHER PUBLICATIONS

International Search Report and Written Opinion Received for PCT Patent Application No. PCT/US2010/041968, Mailed on Feb. 28, 2011, 9 pages.

International Preliminary Report on Patentability Received for PCT Patent Application No. PCT/US2010/041968, Mailed on Feb. 9, 2012, 5 pages.

Extended Search Report received for the European Patent Application No. 10804881.0, mailed on Nov. 5, 2012, 4 pages.

* cited by examiner

COEXISTENCE INTERFACE FOR MULTIPLE RADIO MODULES USING A REDUCED NUMBER OF CONNECTIONS

The present patent application is a continuation-in-part patent application of U.S. patent application Ser. No. 12/327,838, filed Dec. 4, 2008, now U.S. Pat. No. 8,095,176 B2, issued Jan. 10, 2012, the disclosure of which is incorporated by reference herein.

BACKGROUND

Modern electronic devices, such as personal computers, notebook computers, netbook computers, cell phones, smartphones, mobile internet devices, and so on, utilize radio modules to communicate over wireless networks. Often, such devices may include two radio modules, for example, a wireless local area network (WLAN) radio module operating in compliance with an Institute of Electrical and Electronics Engineers (IEEE) 802.11 standard, and a personal area network (PAN) radio module operating in compliance with a Bluetooth protocol. Wireless local area networks are certified by the Wi-Fi Alliance, and are typically referred to as Wi-Fi networks. Alternatively, a wireless wide area network (WWAN), such as a Worldwide Interoperability for Microwave Access (WiMAX) compliant network or a Third Generation (3G) compliant cellular network may be used in combination with a Bluetooth (BT) network. Users of these devices typically will operate both radios simultaneously, for example, by streaming music to the device via the WLAN network and listening to the streamed music with Bluetooth connected headphones.

Due to channel adjacency, simultaneous operation of WLAN and Bluetooth radio modules may result in collisions on the transmission medium, thereby causing interference and/or packet loss. One of the common approaches to mitigate such issues is by using a media access control (MAC) coordination interface, often referred to as "coexistence interface," that attempts to coordinate the operation of the two radios in a manner that minimizes collisions by partitioning the medium usage between radios. Current coexistence interfaces are typically designed as point-to-point interfaces to coordinate between two distinct radio technologies. Such designs may differ by the semantics of the signals in the interface, and/or by the behavior of the MAC layer or higher network layer. For example, a Bluetooth radio should behave differently when working with different types of radios, for example using different parameters for voice calls depending on the technology with which it cooperates.

Increasingly, mobile devices are incorporating three or more radios into a single device which should be designed to coexist in a similar manner as a two-radio device. As multiple radios are, however, combined into single modules, the pin count for a multiple radio interface may be greater than desired for a practical module. Typically, a two-wire interface may be utilized to implement a coexistence interface between two unique radio modules. Adding a third radio module would then involve a four-wire interface, thereby leading to a higher pin count, especially as additional radio modules are added. Furthermore, routing complexity may increase with additional wires used in the coexistence interface. When trying to reduce the number of pins, it may become a challenge to have different semantics on the wires between the two or more interfaces. As a result, the wires cannot be easily combined using simple logic gates or the like. An additional challenge is controlling the direction of the signals. While a Wi-Fi-BT coexistence interface may have two wires with two signals going in opposite directions, a WiMAX-BT coexistence interface may have two wires going from the WiMAX module to the BT module with two signals going in the same direction. This means if a Wi-Fi and WiMAX combination module were provided, to share a wire that functions in different directions, the correct timing between the Wi-Fi and WiMAX combination module and the BT module would have to be accommodated to ensure that the wire is never being driven at both ends simultaneously which might cause electrical malfunctions and/or render a module non-functional.

DESCRIPTION OF THE DRAWING FIGURES

Claimed subject matter is particularly pointed out and distinctly claimed in the concluding portion of the specification. Such subject matter, however, may be understood by reference to the following detailed description when read with the accompanying drawings in which:

Figure 1:
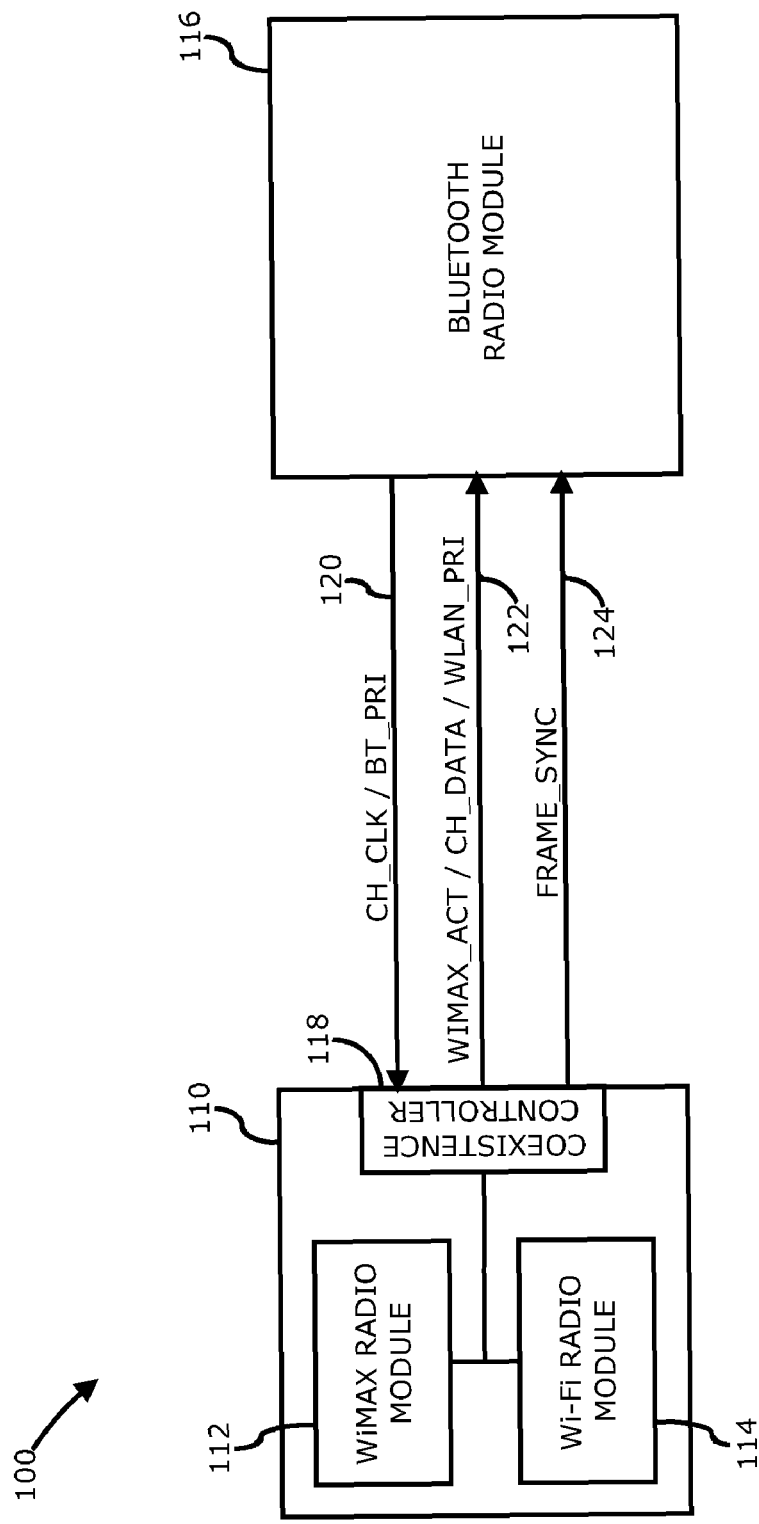
FIG. 1 is a block diagram of an electronic device having multiple radios including a coexistence controller in accordance with one or more embodiments.

It will be appreciated that for simplicity and/or clarity of illustration, elements illustrated in the figures have not necessarily been drawn to scale. For example, the dimensions of some of the elements may be exaggerated relative to other elements for clarity. Further, if considered appropriate, reference numerals have been repeated among the figures to indicate corresponding and/or analogous elements.

DETAILED DESCRIPTION

In the following detailed description, numerous specific details are set forth to provide a thorough understanding of claimed subject matter. It will, however, be understood by those skilled in the art that claimed subject matter may be practiced without these specific details. In other instances, well-known methods, procedures, components and/or circuits have not been described in detail.

In the following description and/or claims, the terms coupled and/or connected, along with their derivatives, may be used. In particular embodiments, connected may be used to indicate that two or more elements are in direct physical and/or electrical contact with each other. Coupled may mean that two or more elements are in direct physical and/or electrical contact. Coupled, however, may also mean that two or more elements may not be in direct contact with each other, but yet may still cooperate and/or interact with each other. For example, "coupled" may mean that two or more elements do not contact each other but are indirectly joined together via another element or intermediate elements. Finally, the terms "on," "overlying," and "over" may be used in the following description and claims. "On," "overlying," and "over" may be used to indicate that two or more elements are in direct physical contact with each other. "Over," however, may also mean that two or more elements are not in direct contact with each other. For example, "over" may mean that one element is above another element, but not contact each other and may have another element or elements in between the two elements. Furthermore, the term "and/or" may mean "and," it may mean "or," it may mean "exclusive-or," it may mean "one," it may mean "some, but not all," it may mean "neither," and/or it may mean "both," although the scope of claimed subject matter is not limited in this respect. In the following description and/or claims, the terms "comprise" and "include," along with their derivatives, may be used and are intended as synonyms for each other.

Referring now to FIG. 1, a block diagram of an electronic device having multiple radios including a coexistence controller in accordance with one or more embodiments will be discussed. As shown in FIG. 1, electronic device 100 may comprise any electronic device utilizing multiple radios. For example, electronic device 100 may comprise a personal computer, notebook computer, netbook computer, cell phone, smartphone, and/or a mobile Internet device, or the like, although the scope of the claimed subject matter is not limited in this respect. In one particular embodiment as shown in FIG. 1, electronic device 100 may include a combination radio module 110 having two or more radio modules such as a WiMAX radio module 112 and a Wi-Fi radio module 114, disposed in a single module or single chip or chipset. Furthermore, electronic device 100 may comprise an additional radio module such as Bluetooth radio module 116. It should be noted that the particular communication standards for the radio modules of FIG. 1 discussed herein are merely for purposes of example, and other types of radio modules compliant with other communication standards may be utilized without providing substantial change to the claimed subject matter or without limiting the scope thereof. In the example embodiment shown in FIG. 1, Bluetooth module 116 may be disposed on a separate card, separate module, and/or separate chip or chipset in electronic device 100 from the card or device on which combination radio module 110 is disposed, and the scope of the claimed subject matter is not limited in this respect.

In one or more embodiments, combination radio module 110 and Bluetooth radio module 116 may operate as follows. Typically, either one or the other of WiMAX radio module 112 and Wi-Fi radio module 114 may operate at a given time such that one module may be active and the other module may be shut off and/or in a standby state. The active radio module coordinates its operation with Bluetooth radio module 116 which may operate at the same time as the active one of WiMAX radio module 112 and Wi-Fi radio module 114. In some embodiments, however, all three radio modules may operate simultaneously or nearly simultaneously such that all three radio modules may be active at a given time, although the scope of the claimed subject matter is not limited in this respect. Since WiMAX radio module 112 and Wi-Fi radio module 114 may be disposed together on a single combination radio module 110, coordination between the WiMAX radio module 112 and the Wi-Fi radio module 114 may be handled internally within the combination radio module 110. Regardless of which of the radio modules of the combination radio module 110 is active, however, coordination is made between combination radio module 110 and Bluetooth radio module 116 via external wires and pins on the respective modules. Typically, coordination allows simultaneous operation of at least one of the modules of combination radio module 110 and Bluetooth radio module 116, and further may involve four wires and four respective pins on each module. In such an arrangement, coordination between WiMAX radio module 112 and Bluetooth radio module 116 may involves a first set of two wires and two pins, and coordination between Wi-Fi radio module 114 and Bluetooth radio module may involve another set of two wires and two pins. As shown in the embodiment shown in FIG. 1, however, the total number of wires and/or pins utilized for coordinating operation between combination radio module 110 and Bluetooth radio module 116 may be reduced by keeping the signal direction static regardless of whether the Wi-Fi radio module 114 or the WiMAX radio module 112 is driving the interface at any given moment. This constraint allows a reduction of wire count from a total of four wires for the two independent interfaces to three wires in the combined interface.

In the embodiment shown in FIG. 1, a coexistence controller 118 in combination radio module 110 may be utilized to control the coordination between WiMAX radio module 112 and Bluetooth radio module 116, and/or between Wi-Fi radio module 114 and Bluetooth radio module 116. Coordination may be accomplished by receiving a channel clock (CH_CLK) signal and/or a Bluetooth priority (BT_PRI) signal on line 120 from Bluetooth module 116. The channel clock signal allows Wi-Fi radio module 114 to synchronize with Bluetooth radio module 116, and the Bluetooth priority signal indicates that the Bluetooth radio module 116 is active and priority should be given to Bluetooth communications. Likewise, coexistence controller 118 of combination radio module 110 may provide a WiMAX active (WIMAX_ACT) signal and/or a channel data (CH_DATA) signal and/or a WLAN priority (WLAN_PRI) signal on line 122. The WiMAX active signal indicates that the WiMAX radio module 112 is active so priority should be given to WiMAX communications. The channel data signal is provided by the Wi-Fi radio module 114 to indicate which channel is being used for Wi-Fi communications. The WLAN priority signal is used to indicate that Wi-Fi radio module 114 is active so priority should be given to Wi-Fi communications. It should be noted that in such an arrangement, lines 120 and 122 are sufficient to handle coordination between Wi-Fi radio module 114 and Bluetooth radio module 116. To further accommodate WiMAX radio module 112, coexistence controller 118 provides a frame sync (FRAME_SYNC) signal to Bluetooth radio module 124 on line 124. The frame sync signal provides a further indication that WiMAX activity is occurring so the Bluetooth radio module 116 knows when to stop and start its own communications to accommodate WiMAX communications. The combination of line 122 and line 124 is sufficient to accommodate coordination between WiMAX radio module 112 and Bluetooth radio module 116. Thus, the functionality of the WiMAX-Bluetooth coexistence scheme and functionality of the Wi-Fi-Bluetooth coexistence scheme may be provided and operate independently. It should be noted that in the arrangement shown in FIG. 1, signal direction on line 120, line 122, and line 124 remains fixed throughout operation regardless of which radio module is active in combination radio module 110. That is, no switching of the signal direction is involved or required.

In one or more embodiments, Wi-Fi radio module 114 and WiMAX radio module 112 may not be associated, i.e., active, although the association state may switch dynamically between the two modules. The Bluetooth radio module 116 detects which radio is associated at a given time, and then switches its operation mode accordingly, including interpretation of the interface semantics. In one or more embodiments, this detection of the associated radio module may be achieved by Bluetooth radio module 116 by monitoring FRAME_SYNC activity on line 124. Upon detection of a certain activity pattern or characteristic, for example, detection of a rising edge on the FRAME_SYNC signal, Bluetooth radio module 116 is capable of deducing that WiMAX radio module 112 is associated, in which case Bluetooth radio module 116 may switch to a WiMAX coexistence mode in response to the FRAME_SYNC signal characteristic. Such a deduction may be made since the FRAME_SYNC signal is utilized by WiMAX radio module 112, but not by Wi-Fi radio module 114. Likewise, detection of another pattern or characteristic in the FRAME_SYNC signal, for example, long inactivity of the signal on line 124 may imply that WiMAX is unassociated, and as a result Bluetooth radio module 116 should switch to Wi-Fi coexistence mode in response to the FRAME_SYNC signal characteristic. Further details regarding the coordination of the radio modules by coexistence controller 118 and by Bluetooth radio module 116 are shown in and described with respect to FIG. 4 and FIG. 5, below. An example WiMAX network on which WiMAX radio module 112 may communicate is shown in and described with respect to FIG. 2, below. An example WLAN/Wi-Fi network on which Wi-Fi radio module 114 may communicate is shown in and described with respect to FIG. 3, below.

Figure 2:
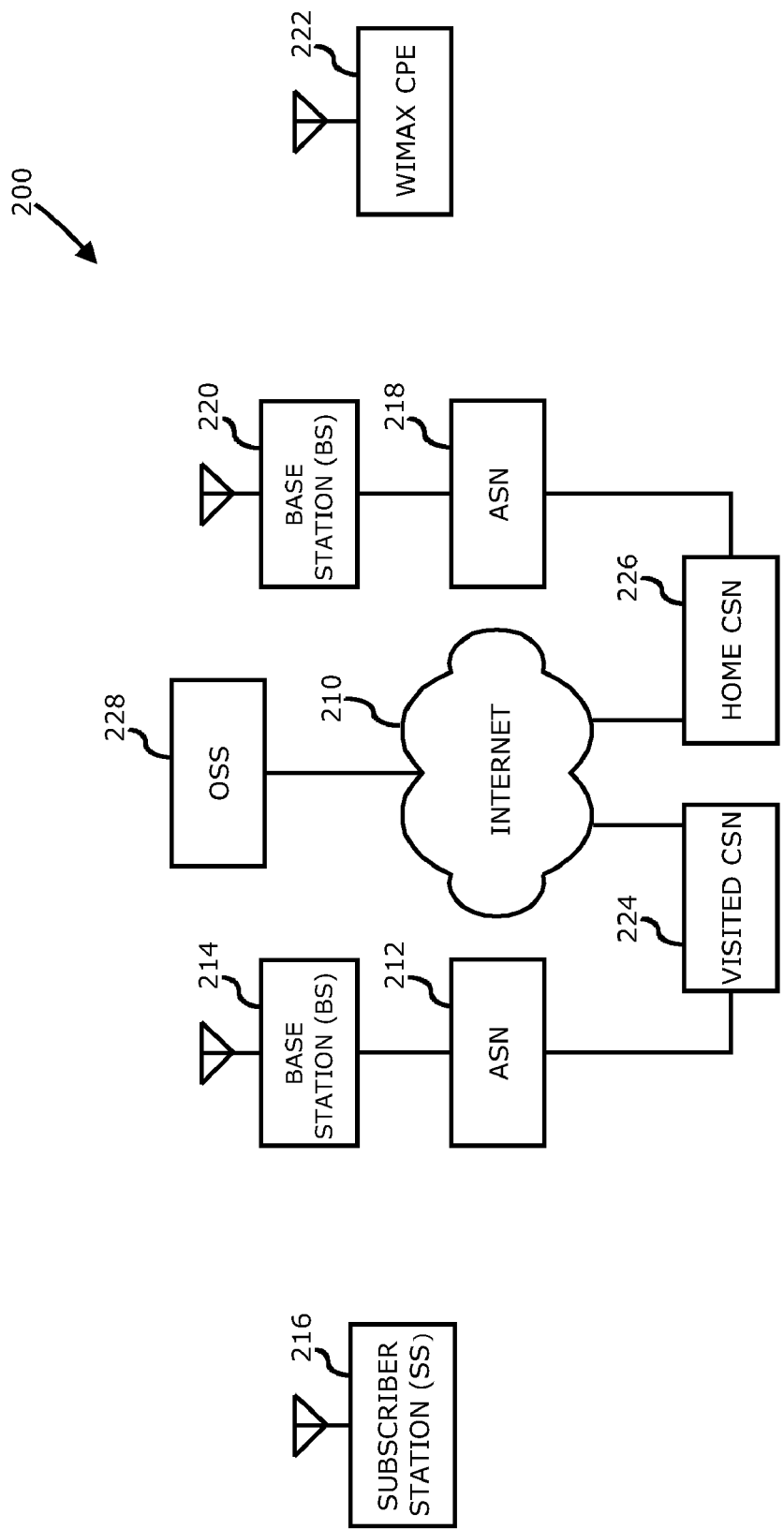
FIG. 2 is a block diagram of a wireless wide area network capable of utilizing a coexistence interface for multiple radio modules using a reduced number of connections with one or more embodiments.

Referring now to FIG. 2, a block diagram of a wireless wide area network capable of utilizing a coexistence interface for multiple radio modules using a reduced number of connections with one or more embodiments will be discussed. In one or more embodiments, WiMAX radio module 112 may communicate on network 200 by being tangibly embodied in one or more of the network elements of network 200. As shown in FIG. 2, network 200 may be an Internet Protocol (IP) type network comprising an Internet 210 type network or the like that is capable of supporting mobile wireless access and/or fixed wireless access to Internet 210. In one or more embodiments, network 200 may be in compliance with a Worldwide Interoperability for Microwave Access (WiMAX) standard or future generations of WiMAX, and in one particular embodiment may be in compliance with an Institute for Electrical and Electronics Engineers 802.16e standard (IEEE 802.16e). In one or more alternative embodiments network 100 may be in compliance with a Third Generation Partnership Project Long Term Evolution (3GPP LTE) or a 3GPP2 Air Interface Evolution (3GPP2 AIE) standard. In general, network 100 may comprise any type of orthogonal frequency division multiple access (OFDMA) based wireless network, and the scope of the claimed subject matter is not limited in these respects. As an example of mobile wireless access, access service network (ASN) 212 is capable of coupling with base station (BS) 214 to provide wireless communication between subscriber station (SS) 216 and Internet 210. Subscriber station 216 may comprise electronic device 100 as shown in and described with respect to FIG. 1, above, for example, via WiMAX radio module 112. ASN 212 may implement profiles that are capable of defining the mapping of network functions to one or more physical entities on network 200. Base station 214 may comprise radio equipment to provide radiofrequency (RF) communication with subscriber station 216, and may comprise, for example, the physical layer (PHY) and media access control (MAC) layer equipment in compliance with an IEEE 802.16e type standard. Base station 214 may further comprise an IP backplane to couple to Internet 210 via ASN 212, although the scope of the claimed subject matter is not limited in these respects.

Network 200 may further comprise a visited connectivity service network (CSN) 224 capable of providing one or more network functions including, but not limited to proxy- and/or relay-type functions, for example, authentication, authorization and accounting (AAA) functions, dynamic host configuration protocol (DHCP) functions, or domain name service controls or the like, domain gateways, such as public switched telephone network (PSTN) gateways or Voice Over Internet Protocol (VOIP) gateways, and/or Internet Protocol (IP) type server functions, or the like. These are, however, merely example of the types of functions that are capable of being provided by visited CSN or home CSN 226, and the scope of the claimed subject matter is not limited in these respects. Visited CSN 224 may be referred to as a visited CSN in the case, for example, in which visited CSN 224 is not part of the regular service provider of subscriber station 216, for example, in which subscriber station 216 is roaming away from its home CSN, such as home CSN 226, or, for example, in which network 200 is part of the regular service provider of subscriber station, but in which network 200 may be in another location or state that is not the main or home location of subscriber station 216.

In a fixed wireless arrangement, WiMAX-type customer premises equipment (CPE) 222 may be located in a home or business to provide home or business customer broadband access to Internet 210 via base station 220, ASN 218, and home CSN 226 in a manner similar to access by subscriber station 216 via base station 214, ASN 212, and visited CSN 224, a difference being that WiMAX CPE 222 is generally disposed in a stationary location, although it may be moved to different locations as needed, whereas subscriber station may be utilized at one or more locations if subscriber station 216 is within range of base station 214, for example. WiMAX CPE 222 may likewise comprise electronic device 100 of FIG. 1, above, for example, via WiMAX radio module 112. In accordance with one or more embodiments, operation support system (OSS) 228 may be part of network 200 to provide management functions for network 200 and to provide interfaces between functional entities of network 200. Network 200 of FIG. 2 is merely one type of wireless network showing a certain number of the components of network 200, and the scope of the claimed subject matter is not limited in these respects.

Figure 3:
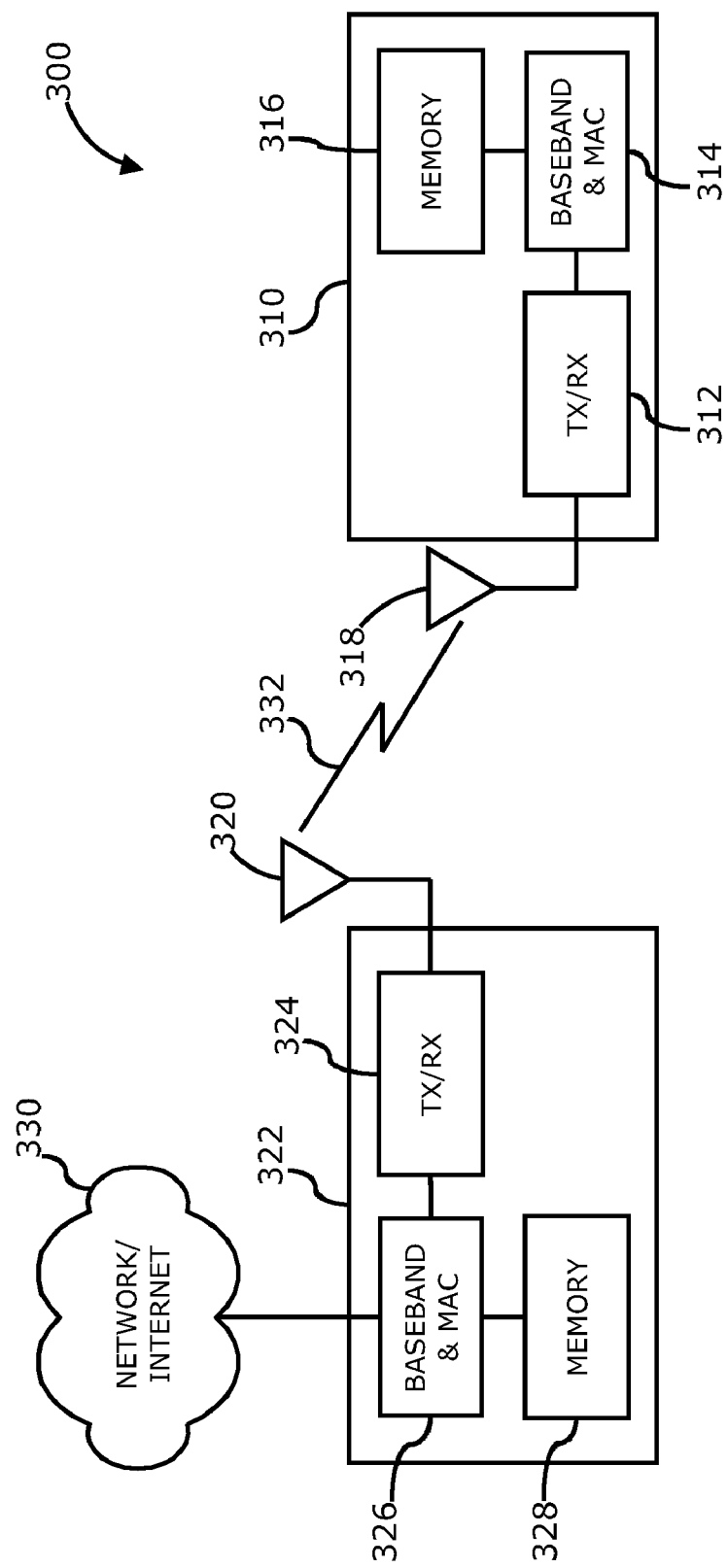
FIG. 3 is a block diagram of a wireless local area network communication system showing one or more network devices capable of utilizing a coexistence interface for multiple radio modules using a reduced number of connections in accordance with one or more embodiments.

Referring now to FIG. 3, a block diagram of a wireless local area network communication system showing one or more network devices capable of utilizing a coexistence interface for multiple radio modules using a reduced number of connections in accordance with one or more embodiments will be discussed. In particular, communication system 300 may illustrate a WLAN network on which Wi-Fi device 114 may communicate. It should, however, be noted that communication system 300 may also illustrate how Bluetooth radio module 116 may communicate in a personal area network (PAN) and/or in a WLAN arrangement as well. In addition, communication system 300 may illustrate how WiMAX radio module 112 may communicate in a WWAN arrangement, and the scope of the claimed subject matter is not limited in these respects. In the communication system 300 shown in FIG. 3, a mobile unit 310 may include a wireless transceiver 312 to couple to an antenna 318 and to a processor 314 to provide baseband and media access control (MAC) processing functions. In one or more embodiments, mobile unit 310 may comprise an information-handling system, such as electronic device 100 of FIG. 1, above, for example, via Wi-Fi radio module 114, WiMAX radio module 112, and/or Bluetooth radio module 116. Processor 314 in one embodiment may comprise a single processor, or alternatively may comprise a baseband processor and an applications processor, although the scope of the claimed subject matter is not limited in this respect. Processor 614 may couple to a memory 316 which may include volatile memory, such as dynamic random-access memory (DRAM), non-volatile memory, such as flash memory, or alternatively may include other types of storage such as a hard disk drive, although the scope of the claimed subject matter is not limited in this respect. Some portion or all of memory 316 may be included on the same integrated circuit as processor 314, or alternatively some portion or all of memory 316 may be disposed on an integrated circuit or other medium, for example, a hard disk drive, that is external to the integrated circuit of processor 314, although the scope of the claimed subject matter is not limited in this respect.

Mobile unit 310 may communicate with access point 322 via wireless communication link 332, in which access point 322 may include at least one antenna 320, transceiver 324, processor 326, and memory 328. In one embodiment, access point 322 may comprise an access point or wireless router of a wireless local or personal area network, although the scope of the claimed subject matter is not limited in this respect. In an alternative embodiment, access point 322 and optionally mobile unit 310 may include two or more antennas, for example, to provide a spatial division multiple access (SDMA) system or a multiple input, multiple output (MIMO) system, although the scope of the claimed subject matter is not limited in this respect. Access point 322 may couple with network 330 so that mobile unit 310 may communicate with network 330, including devices coupled to network 330, by communicating with access point 322 via wireless communication link 332. Network 330 may include a public network, such as a telephone network or the Internet, or alternatively network 330 may include a private network, such as an intranet, or a combination of a public and a private network, although the scope of the claimed subject matter is not limited in this respect. Communication between mobile unit 310 and access point 322 may be implemented via a wireless local area network (WLAN), for example, a network compliant with a an Institute of Electrical and Electronics Engineers (IEEE) standard, such as IEEE 802.11a, IEEE 802.11b, IEEE 802.11g, IEEE 802.11n, HiperLAN-II, and so on, although the scope of the claimed subject matter is not limited in this respect. In one or more embodiments, antenna 318 may be utilized in a wireless sensor network or a mesh network, although the scope of the claimed subject matter is not limited in this respect.

Figure 4:
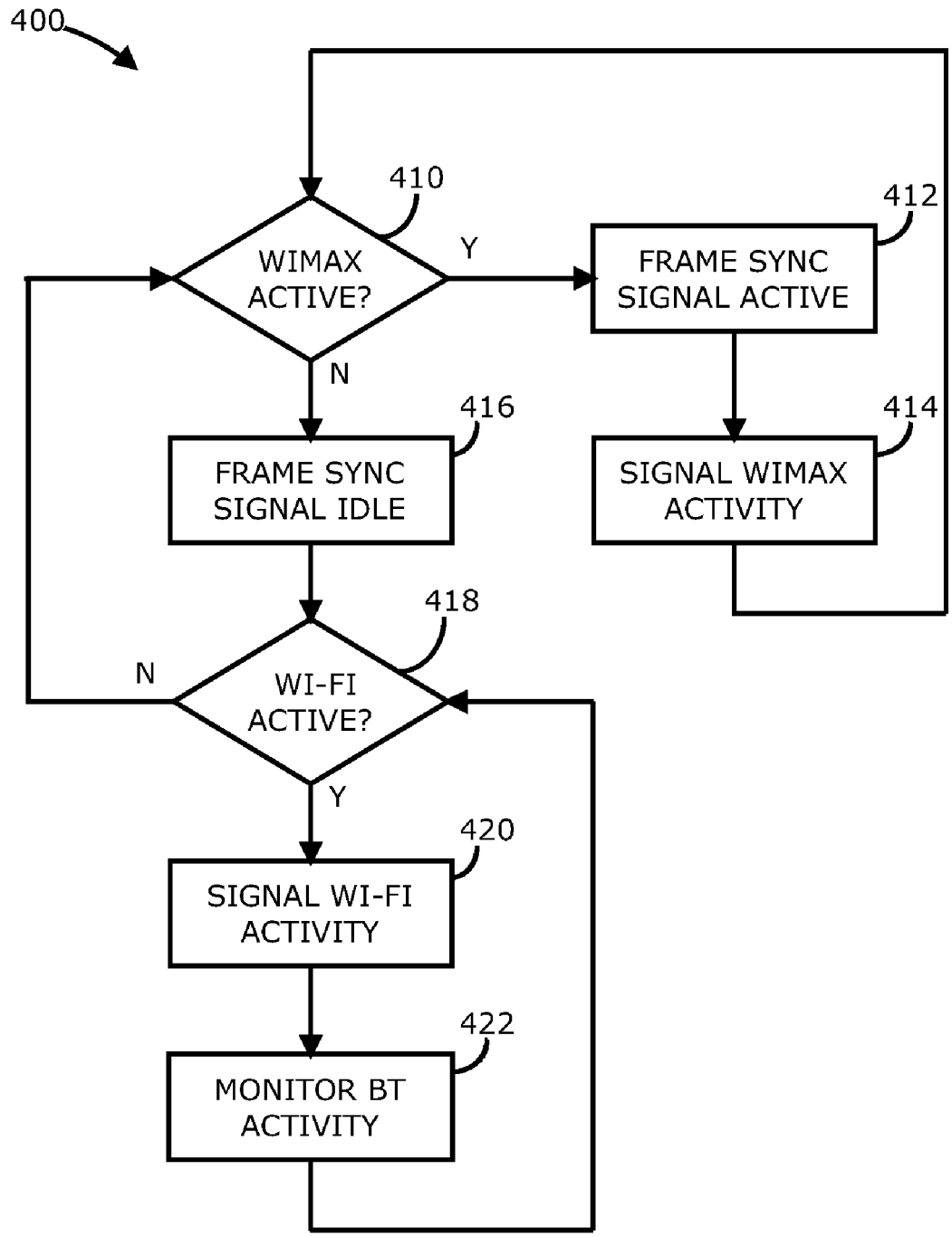
FIG. 4 is a flow diagram of a method implemented by two radio modules to a coordinate with a third radio module in accordance with one or more embodiments.

Referring now to FIG. 4, a flow diagram of a method implemented by two radio modules to a coordinate with another radio module in accordance with one or more embodiments will be discussed. As shown in FIG. 4, method 400 may be implemented by combination radio module 110 to coordinate with Bluetooth radio module 116. In some embodiments, WiMAX radio module 112 and Wi-Fi radio module 114 may be implemented on separate radio modules rather than being arranged in a single radio module 110; however, the scope of the claimed subject matter is not limited in this respect. Furthermore, although method 400 is not limited to the order and/or number of blocks as shown in FIG. 4, and may include more or fewer blocks in various other orders, and the scope of the claimed subject matter is not limited in these respects. In some embodiments, method 400 may be implemented by coexistence controller 118, although the scope of the claimed subject matter is not limited in this respect. As shown in FIG. 4, a determination may be made at decision block 410 by coexistence controller 118 to determine whether WiMAX radio module 112 is active. If WiMAX radio module 112 is active, then the frame sync signal will be active at block 412, which will indicate to Bluetooth radio module 116 via line 124 that WiMAX radio module 112 is associated and active. Furthermore, the WiMAX active signal will signal WiMAX activity at block 414 to Bluetooth radio module 116 via line 122. Whenever WiMAX is associated, activity will be indicated on line 124 via the frame sync signal at least once every maximum idle period for the frame sync signal (FRAME_SYNC_MAX_IDLE time measured in milliseconds) which is a configurable parameter. This will continue so long as WiMAX radio module 112 is active. If there is no activity in the frame sync signal for a time greater than the maximum idle period, coexistence controller 118 may determine that WiMAX radio module 112 is no longer associated and active.

In the event WiMAX radio module 112 is not active, as determined at decision block 410, the frame sync signal will be idle at block 416. A determination may be made at decision block 418 if Wi-Fi radio module 114 is active. If not, coexistence controller will continue to monitor WiMAX radio module 112 and Wi-Fi radio module 114 to determine which one next becomes active. If Wi-Fi radio module 114 becomes active, Wi-Fi activity may be signaled on line 122 at block 420 via a channel data signal and/or a WLAN priority signal depending on the particular Wi-Fi-Bluetooth coexistence scheme being utilized. It should be noted that line 122 may be alternately utilized to signal to Bluetooth radio module 116 activity of WiMAX radio module 112 and Wi-Fi radio module. As a result, line 122 may be shared by both radio modules in combination radio module 110, rather than having a separate line for each of the radio modules for their respective coexistence schemes. As a result, the pin count in combination radio module 110 may be reduced at least from four to three to accommodate the coexistence schemes of both radio modules. It should be further noted that the signal direction on line 122 from both radio modules remains the same regardless of which radio module is active, so that direction-switching arrangements or circuits are not required. If Wi-Fi radio module 114 is associated and active, activity of Bluetooth radio module 116 may be monitored on line 120 at block 422 to implement a Wi-Fi-Bluetooth coexistence scheme. Activity on line 120 will continue to be monitored and interpreted when Wi-Fi radio module 114 is associated, however,. WiMAX radio module 112 does not necessarily need to monitor activity on line 120. Coexistence controller 118 of combination radio module 110 may continue to operate accordingly until Wi-Fi is no longer active, and method 400 may continue based on which of the radio modules is associated and active. Operation of Bluetooth radio module 116 is shown in and described with respect to FIG. 5, below.

Figure 5:
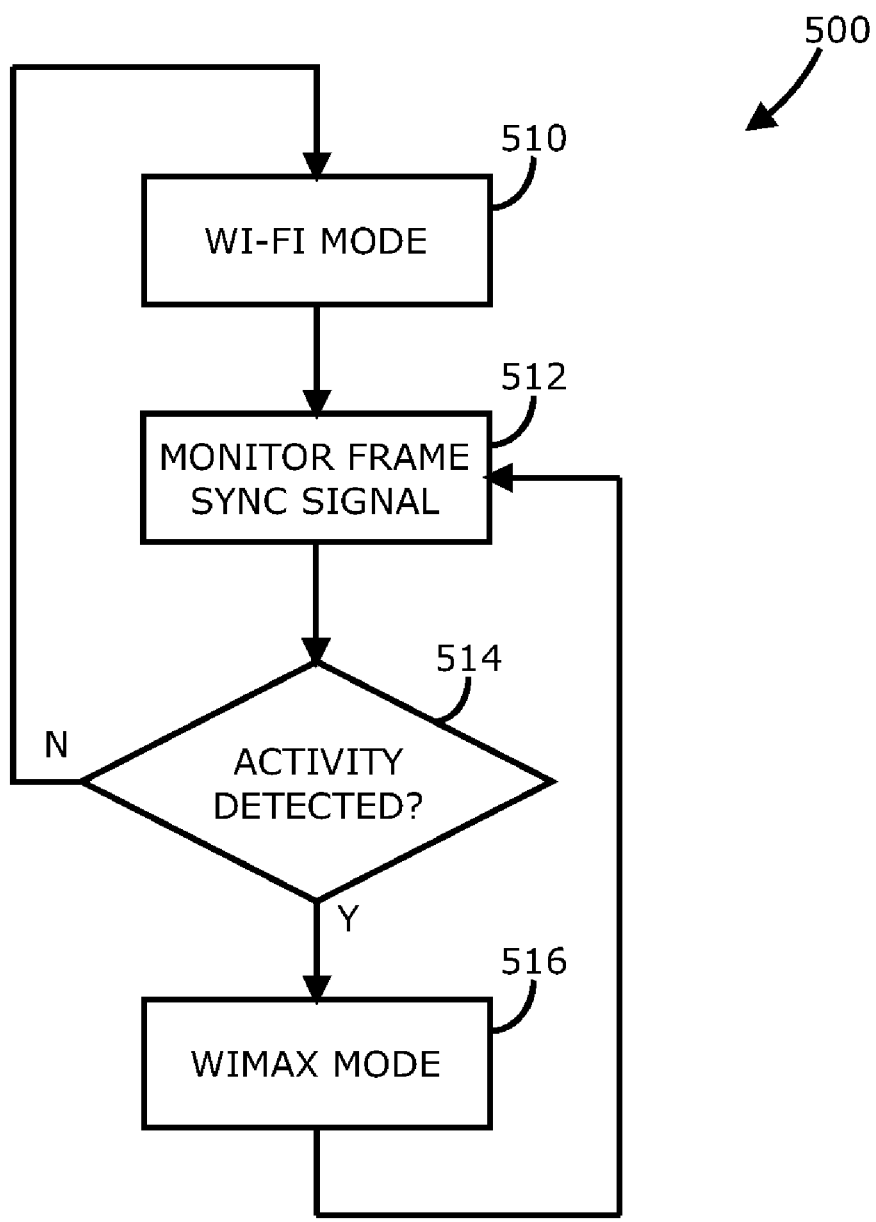
FIG. 5 is a diagram of a method implemented by the third radio module to coordinate with the two other radio modules in accordance with one or more embodiments.

Referring now to FIG. 5, a diagram of a method implemented by a radio module to coordinate with two other radio modules in accordance with one or more embodiments will be discussed. Method 500 of FIG. 5 is not limited to the order and/or number of blocks as shown in FIG. 5, and may include more or fewer blocks in various other orders, and the scope of the claimed subject matter is not limited in these respects. In one or more embodiments, Bluetooth radio module 116 may be in a Wi-Fi coexistence mode at block 510, or alternatively may not be in either a Wi-Fi coexistence mode or a WiMAX coexistence mode, and may be waiting for the next radio module to become associated and active. In any event, Bluetooth radio module 116 monitors the frame sync signal on line 124 for an activity pattern. A determination is made at decision block 514 if activity is detected. For example, an activity pattern that may be detected may include a rising edge on the frame sync signal. In the event activity is detected in the frame sync signal on line 124, Bluetooth radio module 116 may switch to a WiMAX coexistence mode at block 516. While in a WiMAX coexistence mode, Bluetooth radio module 116 may receive and monitor signals on lines 122 and 124 received from WiMAX radio module 112 to coordinate operation between WiMAX radio module 112 and Bluetooth radio module 116 according to the WiMAX-Bluetooth coexistence scheme. Bluetooth radio module 116 may continue to monitor the frame sync signal at block 512 until activity is no longer detected, for example, when the frame sync signal is inactive for a period longer than a maximum idle period. In the event activity of the frame sync signal is no longer detected, Bluetooth radio module 116 may switch to a Wi-Fi coexistence mode at block 510, and method 500 may continue accordingly. While in a Wi-Fi coexistence mode, Bluetooth radio module 116 may receive and monitor signals on line 122, and may provide its own signal on line 120 to Wi-Fi radio module 114 via coexistence controller 118. It should be noted that via the arrangement between combination radio module 110 and Bluetooth radio module 116 of FIG. 1 and via method 400 and method 500 of FIG. 4 and FIG. 5, the number wires involved to implement coexistence between WiMAX radio module 112 and Bluetooth radio module 116, and between Wi-Fi radio module 114 and Bluetooth radio module 116, may be reduced from four wires to three wires so that Bluetooth radio module 116 may only require three pins instead of four pins. The scope of the claimed subject matter, however, is not limited in this respect. An example architecture of a device having a combination radio module 110 and a Bluetooth radio module 116 is shown in and described with respect to FIG. 6, below.

Figure 6:
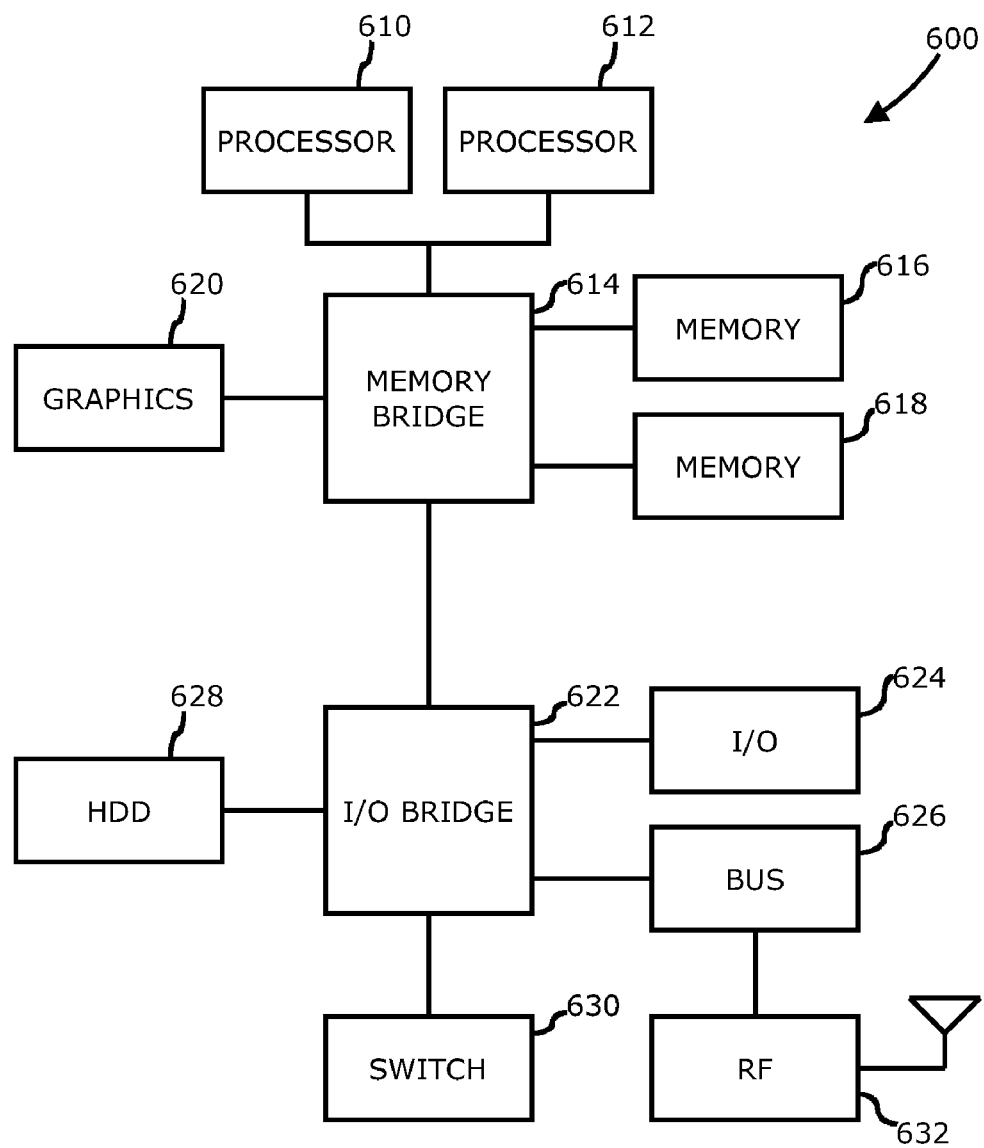
FIG. 6 is a block diagram of an information handling system capable of utilizing a coexistence interface for multiple radio modules using a reduced number of connections in accordance with one or more embodiments.

Referring now to FIG. 6, a block diagram of an information-handling system capable of utilizing a coexistence interface for multiple radio modules using a reduced number of connections in accordance with one or more embodiments will be discussed. Information-handling system 600 of FIG. 6 may tangibly embody electronic device 100 as shown in and described with respect to FIG. 1, above. Although information-handling system 600 represents one example of several types of computing platforms, information-handling system 600 may include more or fewer elements and/or different arrangements of elements than shown in FIG. 6, and the scope of the claimed subject matter is not limited in these respects.

Information-handling system 600 may comprise one or more processors, such as processor 610 and/or processor 612, which may comprise one or more processing cores. One or more of processor 510 and/or processor 612 may couple to one or more memories 616 and/or 618 via memory bridge 614, which may be disposed external to processors 610 and/or 612, or alternatively at least partially disposed within one or more of processors 610 and/or 612.

Memory 616 and/or memory 618 may comprise various types of semiconductor-based memory, for example, volatile-type memory and/or nonvolatile-type memory. Memory bridge 614 may couple to a graphics system 620 to drive a display device (not shown) coupled to information-handling system 600.

Information-handling system 600 may further comprise input/output (I/O) bridge 622 to couple to various types of I/O systems. I/O system 624 may comprise, for example, a universal serial bus (USB) type system, an IEEE 1394 type system, or the like, to couple one or more peripheral devices to information-handling system 600. Bus system 626 may comprise one or more bus systems, such as a peripheral component interconnect (PCI) express type bus or the like, to connect one or more peripheral devices to information-handling system 600. A hard disk drive (HDD) controller system 628 may couple one or more hard disk drives or the like to information-handling system, for example Serial ATA type drives or the like, or alternatively a semiconductor-based drive comprising flash memory, phase-change, and/or chalcogenide-type memory or the like. Switch 630 may be utilized to couple one or more switched devices to I/O bridge 622, for example, Gigabit Ethernet type devices or the like. Furthermore, as shown in FIG. 6, information-handling system 600 may include a radio-frequency (RF) block 632 comprising RF circuits and devices for wireless communication with other wireless communication devices and may comprise combination radio module 110 and/or Bluetooth radio module 116 of FIG. 1. Furthermore, in some embodiments, at least some portions of RF block 632 may be implemented by processor 610, which may include processing of the baseband and/or quadrature signals, although the scope of the claimed subject matter is not limited in this respect.

Although the claimed subject matter has been described with a certain degree of particularity, it should be recognized that elements thereof may be altered by persons skilled in the art without departing from the spirit and/or scope of claimed subject matter. It is believed that the subject matter pertaining to a coexistence interface for multiple radio modules using a reduced number of connections and/or many of its attendant utilities will be understood by the forgoing description, and it will be apparent that various changes may be made in the form, construction and/or arrangement of the components thereof without departing from the scope and/or spirit of the claimed subject matter or without sacrificing all of its material advantages, the form herein before described being merely an explanatory embodiment thereof, and/or further without providing substantial change thereto. It is the intention of the claims to encompass and/or include such changes.

What is claimed is:
1. A method, comprising:
operating a first radio in a first coexistence mode between the first radio and a second radio;
while in the first coexistence mode,
receiving at the first radio from a coexistence controller a first signal on a first line to determine which channel of the second radio is being used by the second radio or that the second radio is active and should be given priority;
sending to the coexistence controller from the first radio a second signal on a second line to synchronize the second radio with the first radio or to indicate the first radio is active and priority should be given to the first radio; and
monitoring at the first radio a third signal received on the first line from the coexistence controller to determine if a third radio is active, the third signal being different from the first signal;
in the event the third radio is active, switching the first radio to a second coexistence mode between the first radio and the third radio and operating the first radio in the second coexistence mode,
while in the second coexistence mode, receiving at the first radio from the coexistence controller a fourth signal on a third line indicating that activity of the third radio is occurring and that first radio can be synchronized to start and stop first radio communications to accommodate third radio activity.

2. A method as claimed in claim 1, wherein the first radio comprises a Bluetooth radio module, the second radio comprises a Wi-Fi radio module, or the third radio comprises a WiMAX radio module, or combinations thereof.

3. A method as claimed in claim 1, wherein the fourth signal comprises a WiMAX frame sync signal.

4. A method as claimed in claim 3, wherein the first signal comprises a Wi-Fi channel data signal or a WLAN priority signal, or combinations thereof, and the second signal comprises a Bluetooth channel clock signal or a Bluetooth priority signal, or combinations thereof, and wherein the third signal comprises a WiMAX active signal.

5. An apparatus, comprising:
a first radio;
a second radio;
a third radio; and
a coexistence controller coupled to the first radio and the second radio, the coexistence controller comprising a coexistence interface to coordinate operation between the first radio and a second radio in a first coexistence mode, and to coordinate operation between the first radio and the third radio in a second coexistence mode, the coexistence interface comprising first, second and third lines,
in the first coexistence mode,
the first line of the coexistence interface being capable of carrying a first signal from the coexistence interface to the first radio indicating which channel of the second radio is being used by the second radio or that the second radio is active and should be given priority, and being capable of carrying a third signal from the coexistence interface to the first radio to determine at the first radio if the third radio is active, the third signal being different from the first signal, and
the second line of the coexistence interface being capable of carrying a second signal from the first radio to the coexistence interface to synchronize the second radio with the first radio or to indicate the first radio is active and priority should be given to the first radio,
the coexistence controller being capable of switching the first radio to a second coexistence mode between the first radio and the third radio and operating the first radio in the second coexistence mode if the third radio is active,
in the second coexistence mode, the third line of the coexistence interface being capable of carrying a fourth signal from the coexistence interface to the first radio indicating that activity of the third radio is occurring and that first radio can be synchronized to start and stop first radio communications to accommodate third radio activity.

6. An apparatus as claimed in claim 5, wherein the first radio comprises a PAN radio, the second radio comprises a WLAN radio, or the third radio comprises a WWAN radio, or combinations thereof.

7. An apparatus as claimed in claim 5, wherein the first radio comprises a Bluetooth radio, the second radio comprises a Wi-Fi radio, or the third radio comprises a WiMAX radio, or combinations thereof.

8. An apparatus as claimed in claim 5, further comprising no more than three pins to implement the coexistence interface for the first and second coexistence modes.

9. An apparatus, comprising:
a first radio coupled to an antenna for communicating over a radio-frequency communication network; and
a controller for controlling the first radio, the controller comprising an interface comprising first, second and third lines;
wherein:
the first radio is arranged to operate in a first coexistence mode between the first radio and a second radio;
the first radio is arranged to receive on the first line from the interface of the controller a first signal on the first line to determine which channel of the second radio is being used by the second radio or that the second radio is active and should be given priority, is arranged to send on the second line to the interface of the controller a second signal (CH_CLK or BT_PRI) on a second line to synchronize the second radio with the first radio or to indicate the first radio is active and priority should be given to the first radio, and is arranged to monitor a third signal received on the first line from the interface of the controller to determine if a third radio is active, the third signal being different from the first signal; and
the first radio is arranged to switch to a second coexistence mode between the first radio and the third radio and to operate the in the second coexistence mode in response to the third radio being active,
in the second coexistence mode, the third line of the interface of coexistence controller being capable of carrying a fourth signal from the interface of the coexistence controller to the first radio indicating that activity of the third radio is occurring and that first radio can be synchronized to start and stop first radio communications to accommodate third radio activity.

10. An apparatus as claimed in claim 9, wherein the first radio and the controller are disposed in a radio module.

11. An apparatus as claimed in claim 9, wherein the first radio comprises a Bluetooth radio.

12. An apparatus as claimed in claim 9, wherein the second radio comprises a Wi-Fi radio.

13. An apparatus as claimed in claim 9, wherein the third radio comprises a WiMAX radio.

14. An information-handling system, comprising:
a processor and a memory coupled to the processor; and
a radio module coupled to the processor, wherein the radio module comprises:
a first radio coupled to an antenna for communicating over a radio-frequency communication network; and
a controller for controlling the first radio, the controller comprising an interface comprising first, second and third lines;
wherein:
the first radio is arranged to operate in a first coexistence mode between the first radio and a second radio;
the first radio is arranged to receive on the first line from the interface of the controller a first signal on the first line to determine which channel of the second radio is being used by the second radio or that the second radio is active and should be given priority, is arranged to send on the second line to the interface of the controller a second signal on a second line to synchronize the second radio with the first radio or to indicate the first radio is active and priority should be given to the first radio, and is arranged to monitor a third signal received on the first line from the interface of the controller to determine if a third radio is active, the third signal being different from the first signal; and
the first radio is arranged to switch to a second coexistence mode between the first radio and the third radio and to operate the in the second coexistence mode in response to the third radio being active,
in the second coexistence mode, the third line of the interface of coexistence controller being capable of carrying a fourth signal from the interface of the coexistence controller to the first radio indicating that activity of the third radio is occurring and that first radio can be synchronized to start and stop first radio communications to accommodate third radio activity.

15. An information-handling system as claimed in claim 14, wherein the first radio comprises a Bluetooth radio, the second radio comprises a Wi-Fi radio, and the third radio comprises a WiMAX radio.

* * * * *